Feb. 21, 1950 — J. LINAHAN — 2,497,893
SYNCHRONIZED AND ADJUSTABLE SAFETY CLUTCH
Filed Sept. 19, 1944
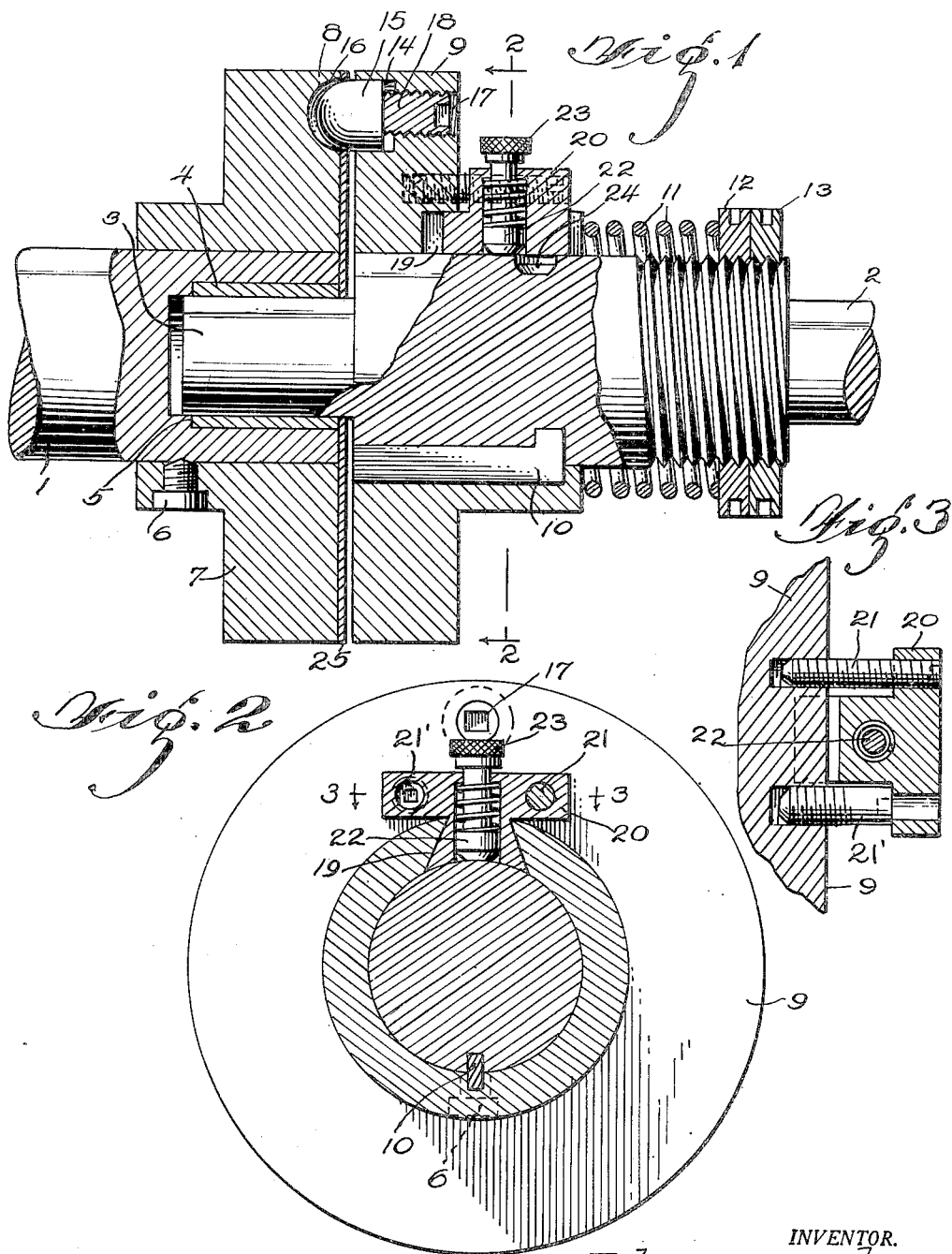
INVENTOR.
John Linahan
BY William F. Desmond
ATTORNEY Patented Feb. 21, 1950

2,497,893

UNITED STATES PATENT OFFICE 2,497,893

SYNCHRONIZED AND ADJUSTABLE SAFETY CLUTCH

John Linahan, United States Army, New York, N. Y.

Application September 19, 1944, Serial No. 554,832

12 Claims. (Cl. 192—56)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to an adjustable safety clutch, and while intended primarily for use in conjunction with machines for "proving" dough before baking, it is obvious that it may be associated with many other types of machines in which safety mechanisms are desirable.

A primary object of the invention resides in the provision of a clutch which will become automatically disengaged upon the imposition of an overload on the machine or when an obstruction is encountered.

Another object of the invention consists in combining with a safety clutch, a means for automatically locking the clutch in open position after the clutch has been automatically "thrown-out."

A further object of the invention consists in providing an adjustable locking pin for the safety clutch, so as to insure proper alignment of the pin with its cooperating recess regardless of changes of dimensions in the mechanism, caused by wear or minor structural alterations.

A still further object of the invention resides in combining with the safety clutch, a means to insure proper synchronization of the parts of the machine when the clutch is returned to operative position after being "thrown-out."

Another object of the invention consists in providing a safety clutch which may be used in a "start-and-stop" machine, so that the means for insuring proper synchronization between the parts when the clutch is reengaged may be adjusted to obtain certain further advantages in the operation of the start-and-stop machine.

Other objects and advantages of the invention will be apparent from the following description when taken in connection with the accompanying drawings, in which—

Figure 1 is a longitudinal sectional view through the novel safety clutch and related parts, showing the clutch members partly separated.

Figure 2 is a transverse sectional view, taken on line 2—2 of Figure 1, and

Figure 3 is a sectional view taken on line 3—3 of Figure 2.

Referring to the drawing in more detail, and especially to Figure 1, the numeral 1 indicates the drive shaft of a machine, either continuously operated or provided with a start and stop drive such as a Geneva mechanism. In axial alignment with shaft 1 is a driven shaft 2 provided with a reduced end portion 3 mounted in a bearing 4, in a central cavity 5 of the drive shaft 1.

Fixed to drive shaft 1 as by means of a set screw 6 is a clutch member 7, provided on its operative face with a rounded recess or depression 8 for cooperating with a round or tapered pin, as will appear hereinafter.

Slidably mounted on the driven shaft 2 is a second clutch member 9, which is keyed to its shaft by a drive key 10. This clutch member is normally urged into cooperation with clutch member 7 by means of a spring 11 which encircles shaft 2 and bears against the adjacent end of the clutch member 9. The opposite end of spring 11 engages the face of an adjustment nut 12 threaded to shaft 2 and adapted to be locked in adjusted position by means of lock nut 13.

The operative face of clutch member 9 is provided with a recess 14 in which is slidably mounted a pin or detent 15 having a rounded end portion 16. Aligned with the recess 14 in this clutch member is a threaded opening 17 in which is mounted a screw 18 for limiting the inward movement of pin 15 in the recess 14. It will be noted that while the pin 15 may be forced outwardly so as to fully engage the recess 8 to thereby prevent any lost-motion between the clutch members, it may also be allowed to assume a position further back in recess 14 by backing off screw 18, so that a slight lost-motion may be provided between the two clutch members.

The outer end of the movable clutch member 9 is provided with a cavity 19 extending inwardly to the shaft 2, and the walls of this cavity form a housing for a slide block 20 which may be adjusted axially of the clutch member. For this purpose screws 21 and 21' are provided. The screw 21 is threaded to the block 20 and to the clutch member 9, while the screw 21' is threaded to the clutch member only. This latter screw serves as a stop for the block 20, and in making an adjustment the screw is backed off to the desired extent and the screw 21' is then turned to bring the block 20 into firm contact with the head of screw 21'. Other types of adjusting means may, of course, be employed in lieu of that just described. Slidably mounted in a radial direction in the block 20 is a spring pressed pin or latch 22 provided with an operating knob 23. This pin 22 serves as a safety device for retaining clutch member 9 in inoperative position after it has been "thrown-out" by the imposition of an overload on the machine, and to this end the shaft 2 is formed with a recess 24 into which the pin is forced by its spring when the clutch member is moved to its rearward position.

One of the operative faces of the clutch members 7 and 9 may be provided with a facing 25 in installations where the safety clutch is used on heavy-duty machines, but when installed in machines requiring relatively slight driving power such facing may be omitted. It will be understood, of course, that where a facing is used on one of the clutch faces it will be provided with an opening in alignment with the pin or detent 15 so as to permit proper functioning of this element. It should also be noted that while only one pin 15 and recess 8 are shown, two or more of these latches could be employed and in such case they would be positioned at unequal distances radially of the clutch members so as to further insure reengagement of the clutch faces only upon assuming a predetermined angular relationship with each other.

In the operation of the device, if an overload is imposed on the driven shaft 2 or if an obstruction is encountered by the machine, the pin 15 will be forced out of its cavity 8 thereby forcing the movable clutch member backward against the pressure of spring 11 and stopping the machine. In this movement of the clutch member the safety pin or latch 22 will be forced into its recess 24 on shaft 2, thereby locking the clutch member in retracted position and preventing further operation of the machine until the pin is manually withdrawn from the recess after the obstruction has been removed or the overload reduced to normal. To insure proper cooperation between the pin 22 and recess 24, at all times, the adjusting screws 21—21' are provided so that the pin may be adjusted axially of its clutch member and shaft 2. For instance, if the clutch lining were removed, as in installations requiring only light work, it will be necessary that the axial position of safety pin 22 be adjusted to compensate for the change in the normal position of the clutch member 9. Also, such an adjustment might become necessary, from time to time, as parts of the mechanism become worn.

As will be readily understood, it is highly essential in many machines that the various operating parts be timed or synchronized so as to prevent major damage to the parts and/or injury to the operators. In the present construction the pin or pins 15 serve the purpose of maintaining the parts fully synchronized at all times during operation. If the automatic clutch of the present invention is thrown out, as heretofore indicated, and latched in retracted position by the safety pin 22, the pin 15 and its cooperating socket or cavity 8 prevent the clutch faces from becoming reengaged until the safety pin 22 is released and the pin 15 is brought into axial alignment with its recess 8, thereby insuring the proper timing or synchronization of the machine elements.

As mentioned hereinbefore, this safety clutch mechanism may be employed in machines driven by a start and stop mechanism providing alternate periods of activity and dwell. This particular type of machine is sometimes used for handling sticky material which is not always easily separable from the members which directly engage it. When the present safety clutch is used in machines of this latter type a beneficial result may be derived from the use of the timing or synchronizing pin 15, in addition to the result obtained when this safety clutch is employed in continuously driven machines. When used with a start and stop machine handling sticky material, the screw 18 should be backed off slightly so as to provide a slight clearance between the sides of the pin 15 and the side walls of the recess 8. When so adjusted a minor lost-motion connection is provided between the two clutch members. At each period of hesitation or dwell of the drive mechanism, the momentum of the machine will cause a slight slippage between the clutch faces thereby carrying the pin forward until it engages the forward side wall of recess 8. At the termination of the dwell period a further minor slippage of the clutch member 7 will cause the rearward wall of the cavity 8 to engage the rearward side of the pin 15 thereby producing a slight jar in the machine itself which causes it to shake loose any sticky material which might otherwise adhere to the operating wheel, drum or finger which was in direct contact with a piece of sticky material.

From the foregoing description taken in connection with accompanying drawings, it will be apparent to those skilled in the art that I have devised a rather simple and inexpensive construction of safety clutch which is not only "thrown-out" by an overload or by an obstruction in the machine, but which is also retained in its inoperative position until intentionally allowed to return to operative position by withdrawing the pin 22; that the pin 22 is axially adjustable so as to take care of wear and tear on the machine and minor structural changes; that proper timing or synchronization of the machine parts is insured by the use of one or more of the pins 15 and cooperating recess 8; and that the timing or synchronizing pin 15 may be adjusted so as to provide a slight jar in certain types of machines.

The mechanism shown herein is intended to be illustrative of the invention and should not be construed in a limiting sense inasmuch as various minor changes may be made in the structural details without departing from the spirit of the invention, and it is intended that all such changes be included within the scope of appended claims.

What is claimed is:

1. In combination, fixed and movable friction clutch members provided with coacting faces, a projection extending from the face of one of said members, the other member provided with a cooperating recess in its face, whereby cooperative engagement of the faces is permitted only when the clutch members have a predetermined angular relationship.

2. In combination, fixed and movable friction clutch members having coacting faces, a single tapered pin slidably mounted in one of said members with a portion extending beyond the face thereof, the other member provided with a single cooperating recess, and adjustable means for limiting the movement of the pin away from said recess.

3. In combination, fixed and movable friction clutch members having coacting faces, a tapered pin slidable mounted in one of said members with a portion extending beyond the face thereof, the other member provided with a cooperating recess, and a screw for limiting the movement of the pin into its clutch member.

4. In combination, a pair of aligned shafts, fixed and movable clutch members on said shafts, a pin bearing associated with the movable clutch member, means for adjusting the bearing axially of its clutch member, a pin slidably mounted in the bearing, a spring for biasing the pin into engagement with the shaft of the movable clutch member, said last-mentioned shaft provided with a recess for cooperation with the pin.

5. In combination, a pair of aligned shafts, fixed and movable clutch members on said shafts, a bearing block slidably mounted in association with the movable clutch member, means for adjusting the bearing block axially of the clutch member, a spring-pressed pin mounted in the bearing block in engagement with the shaft of the movable clutch member, said latter shaft provided with a recess for cooperation with the pin.

6. In combination, a pair of aligned shafts, fixed and movable clutch members on said shafts, the movable clutch member provided with a recess on its inner periphery, a bearing block mounted in said recess and adapted to be moved axially of the shaft, a screw mounted in the movable clutch member, a connection between the screw and bearing block for adjusting the block axially of the shaft, a spring-pressed pin mounted in the bearing block for engagement with the shaft, said shaft provided with a recess for cooperation with the pin.

7. In a machine having a pair of aligned shafts, fixed and movable coacting friction clutch members on and encircling said shafts, means on the clutch faces for forcing the movable clutch member to inoperative position upon the imposition of an overload on the machine, and means for automatically locking the movable clutch member in inoperative position.

8. In a machine having a pair of aligned shafts, fixed and movable coacting friction clutch members on said shafts, and cooperating means on the faces of the clutch members for forcing the movable member to inoperative position upon the imposition of an overload on the machine and for preventing re-engagement of the clutch faces except when arranged in a predetermined angular relationship.

9. In a machine having a pair of aligned shafts, fixed and movable coacting friction clutch members on said shafts, cooperating means on the faces of the clutch members for forcing the movable member to inoperative position upon the imposition of an overload on the machine, and a spring-pressed pin for automatically locking the movable clutch member in inoperative position.

10. In a machine having a pair of aligned shafts, fixed and movable coacting friction clutch members on said shafts, cooperating means on the faces of the clutch members for forcing the movable member to inoperative position upon the imposition of an overload on the machine and for preventing re-engagement of the clutch faces except when arranged in a predetermined angular relationship, and means for automatically locking the movable clutch member in inoperative position.

11. In a machine having a pair of aligned shafts, fixed and movable coacting clutch members on said shafts, a pin having a rounded end protruding beyond the face of one of said members, the face of the other member provided with a recess for cooperation with the pin, whereby the movable clutch member will be forced to inoperative position upon the imposition of an overload on the machine and re-engagement of the clutch faces will be prevented except when arranged in a predetermined angular relationship, and means for automatically locking the movable clutch member in inoperative position.

12. In combination, fixed and movable friction clutch members having coacting faces, a pin having a tapered outer end slidably mounted in one of said members, the other member provided with a recess for cooperating with said tapered outer end, and adjustable means for limiting the movement of the pin within the body of its clutch member.

JOHN LINAHAN.

REFERENCES CITED

The following references are of record in the file of this patent:

UNITED STATES PATENTS

| Number | Name | Date |
| --- | --- | --- |
| 504,479 | Ross | Sept. 5, 1893 |
| 659,072 | Keffer | Oct. 2, 1900 |
| 902,527 | French | Oct. 27, 1908 |
| 979,104 | Smith | Dec. 20, 1910 |
| 998,615 | Huneke | July 25, 1911 |
| 1,511,651 | Brake | Oct. 14, 1924 |
| 1,555,984 | Karge et al. | Oct. 6, 1925 |
| 1,583,889 | Lariviere | May 11, 1926 |
| 1,883,164 | Vassakas | Oct. 18, 1932 |
| 1,999,523 | Willoughby | Apr. 30, 1935 |

FOREIGN PATENTS

| Number | Country | Date |
| --- | --- | --- |
| 127,842 | Switzerland | June 8, 1927 |
| 314,617 | Great Britain | July 4, 1929 |
| 460,681 | Great Britain | Feb. 2, 1937 |